(12) United States Patent
Tabuchi et al.

(10) Patent No.: US 7,713,662 B2
(45) Date of Patent: May 11, 2010

(54) LITHIUM-MANGANESE-BASED COMPOSITE OXIDE CONTAINING TITANIUM AND NICKEL

(75) Inventors: Mitsuharu Tabuchi, Ikeda (JP); Yuko Oka, Ikeda (JP); Tomonari Takeuchi, Ikeda (JP); Kuniaki Tatsumi, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 11/979,961

(22) Filed: Nov. 13, 2007

(65) Prior Publication Data

US 2008/0116418 A1 May 22, 2008

(30) Foreign Application Priority Data

Nov. 20, 2006 (JP) .............................. 2006-312522

(51) Int. Cl.
*H01M 4/48* (2006.01)
*B05D 5/12* (2006.01)
*C01G 45/00* (2006.01)
*C01G 53/00* (2006.01)
*C01D 15/00* (2006.01)

(52) U.S. Cl. .................. 429/231.95; 429/223; 429/224; 429/231.5; 423/49; 423/69; 423/76; 423/138; 423/179.5; 252/182.1

(58) Field of Classification Search ............ 429/231.95, 429/223, 224, 231.5; 423/49, 69, 76, 138; 423/179.5; 252/182.1
See application file for complete search history.

(56) References Cited

U.S. PATENT DOCUMENTS 6,706,443 B1 * 3/2004 Krampitz et al. ............ 429/224
2003/0211235 A1 * 11/2003 Suh et al. ................. 427/126.1

(Continued)

FOREIGN PATENT DOCUMENTS

EP          1837936 A2    9/2007

(Continued)

OTHER PUBLICATIONS

T. Ohzuku and Y. Makimura, "Layered Lithium Insertion Material of $LiNi_{1/2}Mn_{1/2}O_2$: A Possible Alternative to $LiCoO_2$ for Advanced Lithium-Ion Batteries" *Chemistry Letters 2001*, 30 [8] (2001), pp. 744-745.

(Continued)

*Primary Examiner*—Harold Y Pyon
*Assistant Examiner*—Timothy Chiang
(74) *Attorney, Agent, or Firm*—Posz Law Group, PLC (57) ABSTRACT

The invention provides a lithium-manganese-based composite oxide containing Ti and Ni, which is represented by the compositional formula: $Li_{1+x}(Mn_{1-n-m}Ni_mTi_n)_{1-x}O_2$, wherein $0<x\leq0.33$, $0.05<m<0.3$, and $0.3<n<0.5$, and includes a crystal phase of layered rock-salt type structure. The composite oxide is a novel material that is capable of maintaining an average discharge voltage of 3 V or more over long charge/discharge cycles, while providing a discharge capacity equal to or higher than those of lithium-cobalt-oxide-based positive electrode materials, and that can be prepared using starting materials that are inexpensive and less limited as natural resources, while exhibiting improved charge/discharge characteristics over known low-cost positive electrode materials.

5 Claims, 8 Drawing Sheets

U.S. PATENT DOCUMENTS

2004/0091779 A1* 5/2004 Kang et al. ............... 429/231.1

FOREIGN PATENT DOCUMENTS

WO    WO 2006/134833    12/2006

OTHER PUBLICATIONS

M. Tsuda et al., "Electrode performance of layered $LiNi_{0.5}Ti_{0.5}O_2$ prepared by ion exchange" *Journal of Power Sources 144* (2005), pp. 183-190.

J. S. Kim et al., "Layered $xLiMo_2$ (1–x) $Li_2$ $M'O_3$ electrodes for lithium batteries: a study of 0.95 $LiMn_{0.5}Ni_{0.5}O_2$ 0.05$Li_2TiO_3$" *Electrochemistry Communications 4* (2002), pp. 205-209.

European Search Report issued by the European Patent Office on Feb. 3, 2010 in connection with European patent application No. 07022100.7-2111 (English translation provided).

\* cited by examiner

LITHIUM-MANGANESE-BASED COMPOSITE OXIDE CONTAINING TITANIUM AND NICKEL

BACKGROUND OF THE INVENTION (1) Field of the Invention

The present invention relates to lithium-manganese-based composite oxides containing titanium and nickel, which are useful as positive electrode materials for next-generation, low-cost lithium-ion batteries, a method for preparing the same, and uses thereof.

(2) Description of the Related Art

The majority of secondary batteries presently mounted in portable equipment such as cellular phones, notebook computers, etc., in Japan are lithium-ion batteries. Lithium-ion batteries are also expected to become practical as large batteries for use in electric vehicles, electric load leveling systems, etc., and are increasing in importance.

Lithium-ion batteries of today use a lithium cobalt oxide ($LiCoO_2$) as a typical positive electrode material, and a carbon material such as graphite as a negative electrode material.

In such a lithium-ion battery, the number of lithium ions that are reversibly deintercalated (i.e., charging) and intercalated (i.e., discharging) into the positive electrode determines the battery capacity, and the voltages during deintercalation and intercalation determine the battery operating voltage. The positive electrode material $LiCoO_2$ is hence an important material for battery constitution, which is associated with battery performance. Demand for lithium cobalt oxide, therefore, is expected to grow further with the increasing range of applications and increasing size of lithium-ion batteries.

Lithium cobalt oxide, however, contains a large amount of cobalt, which is a rare metal, thus being a cause of the high material costs of lithium-ion batteries. Further, considering the fact that about 20% of cobalt resources are presently used in the battery industry, it seems to be difficult to meet the increasing demand with only positive electrode materials made of $LiCoO_2$.

Lithium nickel oxide ($LiNiO_2$), lithium manganese oxide ($LiMn_2O_4$) and the like have been reported as positive electrode materials that are inexpensive and less limited as natural resources, and some of these materials are in practical use as alternative materials. With lithium nickel oxide, however, battery safety decreases during charging, and with lithium manganese oxide, trivalent manganese dissolves into the electrolyte during charging/discharging at high temperatures (about 60° C.), causing significant deterioration in battery performance. For these reasons, the use of these materials as alternatives has not progressed much.

Composite oxides such as $LiNi_{0.5}Mn_{0.5}O_2$, $LiNi_{0.5}Ti_{0.5}O_2$, $LiNi_{0.45}Mn_{0.45}Ti_{0.10}O_2$ and the like have been proposed as low-cost positive electrode materials that can substitute the aforementioned materials (see Non-Patent Documents 1 to 3 shown below). These positive electrode materials, however, contain the relatively expensive element, nickel, in an amount of 45% or more based on the total amount of transition metals, and therefore are not inexpensive enough. Moreover, none of the positive electrode materials reported in these documents exceeds an initial discharge capacity of 200 mAh/g.

Although Non-Patent Document 3 has reported that the incorporation of Ti into $LiNi_{0.5}Mn_{0.5}O_2$ improves charge/discharge reversibility, it does not teach that the charge/discharge capacity can be increased by the presence of Ti. Moreover, the resulting $Li_2TiO_3$ is electrochemically inactive, and causes the theoretical capacity to decrease, thus limiting the amount of Ti to only 5% based on the total amount of transition metals ($LiNi_{0.475}Mn_{0.475}Ti_{0.05}O_2$).

As described above, various reports have been made on positive electrode materials that can substitute lithium-cobalt-based positive electrode materials; however, for further improvements in charge/discharge characteristics, the optimization of the chemical composition, preparation conditions, etc., of positive electrode materials is desired.

Non-Patent Document 1: T. Ohzuku and Y. Makimura, *Chemistry Letters,* 30[8], 744-745 (2001)

Non-Patent Document 2: M. Tsuda et al., *J. Power Sources,* 144, 183-190 (2005)

Non-Patent Document 3: J. S. Kim et al., *Electrochemistry Communications* 4, 205-209 (2002)

SUMMARY OF THE INVENTION

The invention was accomplished in view of the aforementioned state of the art. A principal object of the invention is to provide a novel material that is capable of maintaining an average discharge voltage of 3 V or more over long charge/discharge cycles, while providing a discharge capacity equal to or higher than those of lithium-cobalt-oxide-based positive electrode materials, and that can be prepared using starting materials that are inexpensive and less limited as natural resources, while exhibiting improved charge/discharge characteristics over known low-cost positive electrode materials.

The inventors conducted extensive research in order to achieve this object. As a result, the inventors found that when a lithium-manganese-based oxide with a novel composition obtained by incorporating specific amounts of Ni and Ti in a $Li_2MnO_3$-based oxide is used as an electrode material for lithium-ion batteries, the resulting batteries exhibit charge/discharge capacities higher than those obtained with lithium-nickel-manganese-based composite oxides not containing titanium. This finding has led to the completion of the invention.

The invention provides a lithium-manganese-based composite oxide containing Ti and Ni, a method for preparing the same, a positive electrode material comprising the same for use in lithium-ion batteries, and lithium-ion batteries comprising the same, as summarized below:

1. A lithium-manganese-based composite oxide containing Ti and Ni, which is represented by the compositional formula: $Li_{1+x}(Mn_{1-n-m}Ni_mTi_n)_{1-x}O_2$, wherein $0 < x \leq 0.33$, $0.05 < m < 0.3$, and $0.3 < n < 0.5$, and comprises a crystal phase of layered rock-salt type structure.

2. The lithium-manganese-based composite oxide containing Ti and Ni according to Item 1, comprising a crystal phase of layered rock-salt type structure and a crystal phase of cubic rock-salt type structure.

3. The lithium-manganese-based composite oxide containing Ti and Ni according to Item 1 or 2, wherein the molar ratio of Ni to Mn is from 0.2 to 0.7.

4. A method for preparing a lithium-manganese-based composite oxide containing Ti and Ni as defined in any of Items 1 to 3, comprising forming a precipitate by alkalizing an aqueous solution containing a manganese compound, a titanium compound, and a nickel compound; hydrothermally treating the precipitate along with an oxidizing agent and a water-soluble lithium compound under alkaline conditions; and firing the hydrothermally treated product in the presence of a lithium compound.

5. A positive electrode material for lithium-ion batteries, comprising a lithium-manganese-based composite oxide containing Ti and Ni as defined in any of Items 1 to 3.

6. A lithium-ion battery comprising a positive electrode material as defined in Item 5.

DETAILED DESCRIPTION OF THE DRAWINGS

FIGS. 4 (a) and (b) are electronic image-processed electron micrographs of lithium-manganese-based composite oxides containing Ti and Ni according to Examples 1 and 2, respectively, and FIG. 4 (c) is an electronic image-processed electron micrograph of a lithium-nickel-manganese-based composite oxide according to Comparative Example 1;

FIG. 8 (a) is a graph illustrating the initial discharge characteristics of coin-type lithium cells each using a sample according to Example 2 or Comparative Example 1 as positive electrode materials which were measured at 30, 0 and −20° C. and a current density of 42.5 mA/g after charging to 4.8 V at 30° C.; and FIG. 8 (b) is a graph illustrating the initial discharge characteristics of each of the aforementioned types of coin-type lithium cells measured at −20° C. and a current density of 8.5 mA/g to a cutoff voltage of 2.0 V.

DETAILED DESCRIPTION OF THE INVENTION

The lithium-manganese-based composite oxide containing Ti and Ni according to the invention is a novel compound represented by the formula: $Li_{1+x}(Mn_{1-n-m}Ni_mTi_n)_{1-x}O_2$, wherein $0 < x \leq 0.33$, $0.05 < m < 0.3$, and $0.3 < n < 0.5$. This composite oxide is basically composed of a rock-salt type structure, which is a typical crystal structure of oxides, and comprises a crystal phase of layered rock-salt type structure similar to that of a known compound $LiCoO_2$. Provided that it comprises a crystal phase of layered rock-salt type structure, the composite oxide of the invention may also be a mixture of phases that include a crystal phase of another rock-salt type structure (e.g., cubic rock-salt type structure) having a different cation distribution. The composite oxide obtained according to the method described below via a hydrothermal reaction typically comprises a crystal phase of cubic rock-salt type structure similar to that of $\alpha$-$LiFeO_2$, in addition to a crystal phase of layered rock-salt type structure. The composite oxide, in either of these phases, is considered to exhibit excellent charge/discharge characteristics. In this case, the proportion (by weight) of the crystal phase of layered rock-salt type structure to the crystal phase of cubic rock-salt type structure is typically from about 10:90 to about 90:10.

Figure 1:
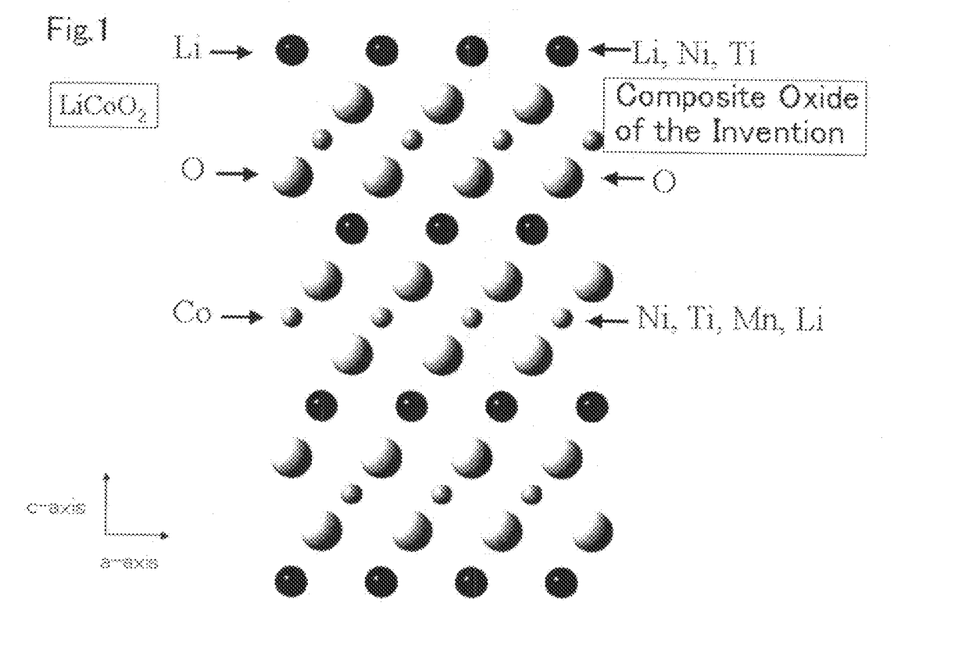
FIG. 1 is a schematic diagram depicting a crystal phase of layered rock-salt type structure in the crystal phases of the lithium-manganese-based composite oxide containing Ti and Ni according to the invention.
Figure 2:
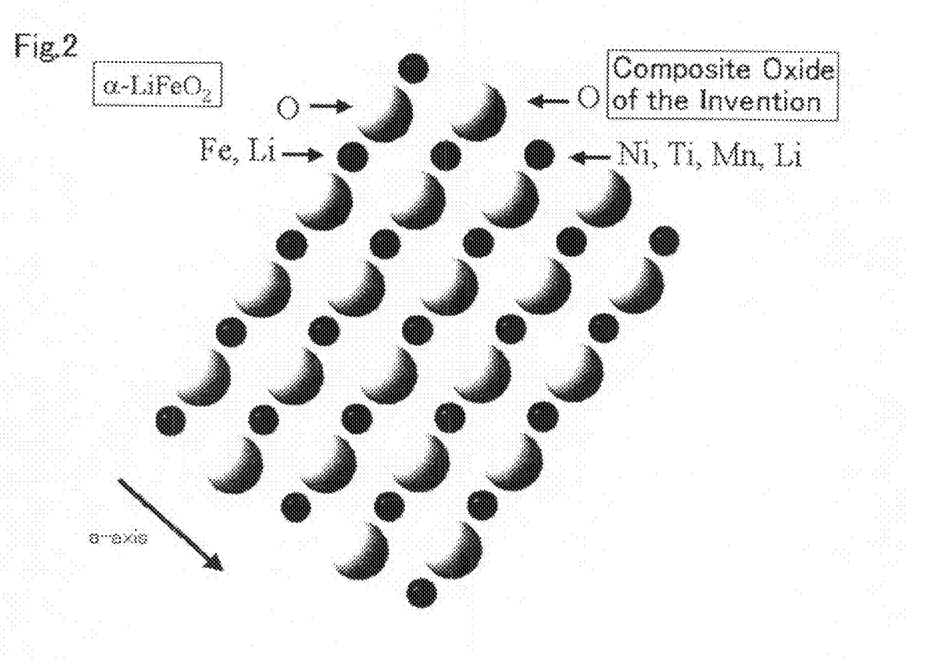
FIG. 2 is a schematic diagram depicting a crystal phase of cubic rock-salt type structure in the crystal phases of the lithium-manganese-based composite oxide containing Ti and Ni according to the invention.

FIG. 1 is a schematic diagram depicting a crystal phase of layered rock-salt type structure in the crystal phases of the lithium-manganese-based composite oxide containing Ti and Ni according to the invention; and FIG. 2 is a schematic diagram depicting a crystal phase of cubic rock-salt type structure in the crystal phases of the lithium-manganese-based composite oxide containing Ti and Ni according to the invention.

The left side of FIG. 1 indicates the elements contained in the layers of the crystal of $LiCoO_2$; and the right side of FIG. 1 indicates the elements contained in the layers of the crystal of the composite oxide of the invention. The cubic rock-salt type structure, which is referred to as "NaCl structure", corresponds to the structure shown in FIG. 2, wherein all of the cations shown in FIG. 1 exist on the same crystallographic site.

Referring back to FIG. 1, $LiCoO_2$ has a crystal structure in which Co ions and Li ions are arranged two-dimensionally along the a-axis and stacked alternately along the c-axis, in the interstitial positions of the octahedral structure of cubic-close-packed oxide ions. On the other hand, in the crystal phase of layered rock-salt type structure of the lithium-manganese-based oxide containing Ti and Ni according to the invention, Li, Ni, Ti, and Mn ions are present in the same layer as the Co layer of $LiCoO_2$, and the ions in the Li layer are partially substituted by Ni and Ti ions.

It is important for the composite oxide of the invention to comprise a specific proportion of Ti ions. If a lithium-manganese-based composite oxide not containing Ti ions is fired at high temperatures during preparation, the oxide tends to show a lack of Li due to the volatilization of Li. Because Li contained in the oxide is a component that contributes to charging/discharging, a lack of Li may deteriorate the charge/discharge characteristics. The composite oxide of the invention yields significantly improved charge/discharge characteristics over those obtained with lithium-nickel-manganese composite oxides not containing Ti, which is believed to be because the presence of Ti remarkably inhibits a loss of Li, thereby increasing the Li component that contributes to charging/discharging.

In the lithium-manganese-based composite oxide containing Ti and Ni, the proportion of Ni ions (the value m: Ni/(Ni+Mn+Ti)) is more than about 5 mol % and less than about 30 mol % based on the amount of metal ions other than Li ions, i.e., about 0.05<Ni/(Ni+Mn+Ti)<0.30. The proportion of Ni ions is preferably about 0.1<Ni/(Ni+Mn+Ti)<0.25. The use of an excess proportion of Ni ions is not preferable, because it will increase the material cost of the expensive Ni to increase the cost of the positive electrode material. If the proportion of Ni ions is too small, however, sufficient improvements in charge/discharge characteristics cannot be attained because, for example, the electron conductivity of the resulting positive electrode material decreases.

The proportion of Ti ions in the composite oxide (the value n: Ti/(Ni+Mn+Ti)) is more than about 30 mol % and less than about 50 mol % based on the amount of metal ions other than Li ions, i.e., about 0.3<Ti/(Ni+Mn+Ti)<0.5. The proportion of Ti ion is preferably about 0.35<Ti/(Fe+Mn+Ti)<0.45. The use of a large proportion of Ti that does not contribute to charging/discharging is not preferable, because it will cause the charge/discharge capacity to decrease. Conversely, the use of too small a proportion of Ti ions is also not preferable because effects such as increased Li content cannot be sufficiently attained.

It is particularly preferable that the molar ratio of Ni to Mn in the composite oxide is about $0.2<Ni/Mn<0.7$, and more preferably about $0.3<Ni/Mn<0.6$. The composite oxide, which contains Ti and has a Ni/Mn molar ratio within the aforementioned range, exhibits high energy density.

As long as the lithium-manganese-based composite oxide of the invention can maintain the structure comprising rock-salt type structure, x in the formula $Li_{1+x}(Mn_{1-m-n}Ni_mTi_n)_{1-x}O_2$ may be about $0<x\leq0.33$ according to the average valence of the transition metal ions. Preferably, x is about $0.05\leq x\leq0.30$.

The composite oxide may further comprise impurity phases of lithium hydroxide, lithium carbonate, a titanium compound, a nickel compound, a manganese compound (as well as their hydrates) and the like to such an extent that the charge/discharge characteristics are not seriously affected (a maximum of about 10 mol %).

The composite oxide of the invention can be prepared by a general synthetic process, such as a hydrothermal reaction, a solid phase reaction, etc. A process utilizing a hydrothermal reaction is especially preferable, because it facilitates the formation of a composite oxide with excellent charge/discharge performance.

One example of a process utilizing a hydrothermal reaction is as follows. A solution containing metal compounds, which are the sources of producing nickel, manganese or titanium ions, dissolved in water, a water/alcohol mixture or the like is first alkalized to form a precipitate therefrom. An oxidizing agent and a water-soluble lithium compound are then added to the precipitate, and the mixture is hydrothermally treated under alkaline conditions to obtain a lithium-manganese-based composite oxide containing Ti and Ni. The resulting composite oxide is then mixed with a lithium compound and fired. During this step, the amount of the lithium compound and firing conditions are adjusted so as to control properties of the powder such as particle diameter, Li content, etc, to obtain a target composite oxide. This process is described below in more detail.

Any kind of suitable nickel compound, manganese compound, and titanium compound may be used, as long as they can form an aqueous solution containing these compounds. Typically, compounds that are soluble in water may be used. Specific examples of such water-soluble compounds include water-soluble salts such as chlorides, nitrates, sulfates, oxalates, acetates and the like, hydroxides, etc. Such water-soluble compounds may be in the form of anhydrides or hydrates. Water-insoluble compounds such as oxides can also be used as metal sources for aqueous solutions by, for example, dissolving them with acids such as hydrochloric acid and the like. A single or a combination of starting compounds may be used for each of the metal sources.

The proportions of the nickel compound, manganese compound and titanium compound in the aqueous solution may be such that the ratios of these metal elements correspond to that of a target composite oxide.

The concentration of each of these compounds in the aqueous solution may suitably be determined so as to allow the formation of a uniform aqueous solution and smooth formation of a coprecipitate. The total concentration of the nickel, manganese and titanium compounds is typically from about 0.01 to about 5 mol/L, and preferably about 0.1 to about 2 mol/L.

As a solvent of the aqueous solution, water may be used singly, or a water/alcohol mixture containing a water-soluble alcohol, such as methanol, ethanol, etc., may be used. The use of a water/alcohol mixture allows the formation of a precipitate at temperatures below 0° C. The amount of alcohol may suitably be determined according to the intended temperature at which a precipitate is formed, but a suitable amount is typically from about 50 wt parts or less per 100 wt parts of water.

A precipitate (coprecipitate) can be formed by alkalizing the solution. The conditions for forming a satisfactory precipitate cannot be generalized, since they depend upon the kind, concentration, etc., of each compound contained in the solution, but typically, the pH of the aqueous solution is preferably about 8 or more, and more preferably about 11 or more.

The aqueous solution may be alkalized using any suitable process, typically by adding an alkali or an aqueous solution containing an alkali to the aqueous solution containing metal compounds. Alternatively, a coprecipitate can be formed by adding the aqueous solution containing metal compounds to an aqueous solution containing an alkali.

Examples of alkalis used for alkalizing the aqueous solution include alkali metal hydroxides such as potassium hydroxide, sodium hydroxide, lithium hydroxide and the like, ammonia, etc. When such an alkali is used in the form of an aqueous solution, the concentration of the aqueous solution may, for example, be from about 0.1 to about 20 mol/L, and preferably about 0.3 to about 10 mol/L. As with the aqueous solution containing metal compounds described above, the alkali may be dissolved in a water/alcohol mixture containing a water-soluble alcohol.

During the formation of a precipitate, the temperature of the aqueous solution is from about −50 to about +15° C., and preferably from about −40 to about +10° C., so as to prevent heat due to neutralization from being generated during the reaction, and allow a uniform coprecipitate to be easily formed.

After alkalizing the aqueous solution, the precipitate is preferably oxidized and aged by bubbling air through the reaction solution at about 0 to about 150° C. (preferably about 10 to about 100° C.) for about 1 to about 7 days (preferably about two to about 4 days).

The resulting precipitate can be purified by washing with distilled water or the like to remove excess alkali components, residual reactants, etc., and then filtering.

The precipitate thus obtained is then hydrothermally treated together with an oxidizing agent and a water-soluble lithium compound under alkaline conditions. The hydrothermal treatment can be performed by heating an aqueous solution containing the precipitate, oxidizing agent and water-soluble lithium compound under alkaline conditions. Heating can usually be performed in a sealed container.

The content of the precipitate containing nickel, manganese and titanium in the aqueous solution used in the hydrothermal reaction is preferably from about 1 to about 100 g, and more preferably from about 10 to about 80 g, per liter of water.

Examples of water-soluble lithium compounds include water-soluble lithium salts such as lithium chloride, lithium nitrate and the like, lithium hydroxide, etc. Such water-soluble lithium compounds may be used singly or in combination, in the form of anhydrides or hydrates.

The amount of water-soluble lithium compound is preferably such that the molar ratio of the lithium to the total moles of Ni, Mn and Ti in the precipitate, i.e., Li/(Ni+Mn+Ti) is from about 1 to about 10, and more preferably from about 3 to about 7.

The concentration of the water-soluble lithium compound is preferably from about 0.1 to about 10 mol/L, and more preferably from about 1 to about 8 mol/L.

Any suitable oxidizing agent that decomposes and generates oxygen during the hydrothermal reaction may be used. Specific examples include potassium chlorate, lithium chlorate, sodium chlorate, hydrogen peroxide, etc.

The concentration of the oxidizing agent is preferably from about 0.1 to about 10 mol/L, and more preferably from about 0.5 to about 5 mol/L.

Typically, during the hydrothermal reaction, the aqueous solution preferably has a pH of about 8 or more, and more preferably about 11 or more.

When the aqueous solution containing the precipitate, oxidizing agent and water-soluble lithium compound is under alkaline conditions, the solution can be directly heated; if, however, the aqueous solution has a low pH value, the pH value may be increased by adding, for example, an alkali metal hydroxide such as potassium hydroxide, sodium hydroxide or the like, ammonia, or the like.

The hydrothermal reaction can be carried out using equipment generally used for hydrothermal reactions (e.g., a commercially available autoclave).

The hydrothermal reaction may be carried out under any suitable conditions, but typically at about 100 to about 300° C. for about 0.1 to about 150 hours, and preferably at about 150 to about 250° C. for about 1 to about 100 hours.

After the completion of the hydrothermal reaction, the reaction product is typically washed to remove residues such as residual lithium compound, etc. Washing can be done with, for example, water, water/alcohol, acetone, etc. The product is then filtered and dried at a temperature of, for example, 80° C. or higher (usually about 100° C.) to obtain a lithium-manganese-based composite oxide containing Ti and Ni.

In accordance with the invention, the lithium-manganese-based composite oxide obtained as above may be fired together with a lithium compound so as to control the Li content and powder properties, thus resulting in a target lithium-manganese-based composite oxide containing Ti and Ni which is basically made of a rock-salt type structure.

The lithium compound used may be any suitable compound containing lithium, and specific examples include lithium salts such as lithium chloride, lithium nitrate, lithium acetate and the like, lithium hydroxide, hydrates thereof, etc. The amount of the lithium compound may be from about 0.01 to about 2 mol per mol of the lithium-manganese-based composite oxide obtained via a hydrothermal process.

Preferably, firing is performed after the lithium-manganese-based composite oxide obtained via a hydrothermal process is blended with a lithium compound and pulverized, in order to improve reactivity. Pulverization may be performed to such an extent that the mixture does not contain coarse particles and assumes a uniform color tone.

While the lithium compound may be used in the form of a powder, aqueous solution or the like, it is preferably used in an aqueous solution form in order to ensure the homogeneity of the reaction. In this case, the concentration of the aqueous solution of the lithium compound may typically be from about 0.1 to about 10 mol/L.

Firing may be performed in any suitable atmosphere such as air, an oxidizing atmosphere, an inert atmosphere, a reducing atmosphere, and other types of atmospheres. The firing temperature is preferably from about 200 to about 1000° C., and more preferably from about 300 to about 800° C. The firing time, including the time it takes for the firing temperature to be attained, is preferably from about 0.1 to about 100 hours, and more preferably from about 0.5 to about 60 hours.

After the completion of firing, the fired product is usually washed with water, a solvent or the like to remove excess lithium compound. The resulting product is then filtered and may be dried by heating at a temperature of, for example, 80° C. or higher, and preferably about 100° C.

By further repeating, as necessary, a series of procedures consisting of pulverizing the heat-dried product, adding a lithium compound, firing, washing, and drying, the excellent characteristics of the lithium-manganese-based composite oxide (i.e., stable charge/discharge characteristics, high capacity, and the like in the operating voltage region as a positive electrode material of lithium-ion batteries) can further be improved.

A lithium-ion battery comprising the lithium-manganese-based composite oxide containing Ti and Ni according to the invention can be manufactured according to a known process. Such a lithium-ion battery is assembled according to a common method, using the novel composite oxide of the invention as a positive electrode material; a known material such as metallic lithium, a carbon-based material (e.g., activated carbon, graphite, etc.) or the like as a negative electrode material; a known electrolytic solution containing a lithium salt such as lithium perchlorate, $LiPF_6$ or the like dissolved in a solvent such as ethylene carbonate, dimethyl carbonate or the like as an electrolyte; and other known battery-constituting elements.

As explained above, in accordance with the invention, a novel composite oxide useful as a positive electrode material is obtainable using low-cost starting materials and elements. This novel composite oxide is capable of maintaining an average discharge voltage of 3 V or more, while exhibiting a discharge capacity (200 mAh/g or more) and an energy density (700 mWh/g or more) that are equal to or higher than those obtained with lithium-cobalt-oxide-based positive electrode materials.

Such a high capacity provided by the lithium-manganese-based composite oxide containing Ti and Ni is attributed to the shape of the discharge curve that decreases gradually toward the discharge cut-off voltage (2.0 V), which is not observed in known positive electrode materials. The capacity can further be increased easily by reducing the discharge cut-off voltage to about 2.0 V.

Moreover, the composite oxide has a discharge capacity as high as 200 mAh/g or more at 30° C., 140 mAh/g or more at 0° C., or 50 mAh/g or more at −20° C. The composite oxide therefore exhibits excellent performance even in a low-temperature environment, and is very suitable as a positive electrode material not only for small consumer-oriented lithium-ion batteries, but also for large lithium-ion batteries mounted in vehicles, etc.

In particular, the composite oxide of the invention comprises a large proportion of Li ions, which is the component that contributes to charging/discharging, and is composed of fine particles. The composite oxide therefore exhibits high utilization and excellent charge/discharge characteristics. In addition, the composite oxide contains the expensive nickel ions in a proportion as low as 30 mol % or less, and is therefore inexpensive.

The composite oxide of the invention with the above-described excellent performance is very useful as a high-capacity, low-cost positive electrode material for use in lithium-ion batteries.

EXAMPLES

The invention will become even more apparent by way of Examples and Comparative Examples described below.

Example 1

To 500 mL of distilled water was added 11.88 g of a nickel (II) chloride hexahydrate, 19.79 g of a manganese (II) chloride tetrahydrate, and 80.00 g of a 30% aqueous titanium sulfate solution (total amount: 0.25 mol, Ni:Mn:Ti molar ratio=1:2:2), and thoroughly dissolved. An aqueous lithium hydroxide solution (a solution containing 50 g of a lithium hydroxide monohydrate dissolved in 500 mL of distilled water) was prepared in a separate beaker. After pouring this aqueous lithium hydroxide solution into a titanium beaker, 200 mL of ethanol was added and stirred. The lithium hydroxide solution was then allowed to stand in a thermostat at a constant temperature of −10° C. The aqueous solution of metal salts obtained above was then added dropwise into the aqueous lithium hydroxide solution over a period of 2 to 3 hours, thus forming a Ni—Mn—Ti precipitate. After confirming that the solution had been made completely alkaline (a pH of 11 or more), the solution containing the coprecipitate was oxidized while stirring by bubbling air through the solution at room temperature for 2 days, to age the precipitate.

The resulting precipitate was washed with distilled water and filtered. The precipitate was then placed into a polytetrafluoroethylene beaker along with 50 g of a lithium hydroxide monohydrate, 50 g of potassium chlorate, 309 g of potassium hydroxide, and 600 mL of distilled water, and stirred well. The resulting aqueous solution had a pH of 11 or more. The solution was then placed in a hydrothermal reactor (autoclave) and hydrothermally treated at 220° C. for 8 hours.

After the completion of the hydrothermal treatment, the reactor was cooled to about room temperature, and the beaker containing the hydrothermally reacted solution was taken out from the autoclave. The formed precipitate was washed with distilled water to remove salts such as excess lithium hydroxide, and filtered to obtain a powdery product (a lithium-manganese-based composite oxide containing Ti and Ni).

The filtered powder was mixed with an aqueous solution containing 5.25 g of a lithium hydroxide monohydrate dissolved in 100 mL of distilled water and stirred. The mixture was then dried at 100° C. overnight and pulverized to form a powder.

The powder was then heated in air to 650° C. over 1 hour. After firing at that temperature for 1 minute, the powder was cooled to about room temperature in a furnace, and then the fired product was washed with distilled water to remove excess lithium salts. The resultant product was filtered and dried to obtain a target lithium-manganese-based composite oxide containing Ti and Ni as a powdery product.

Figure 3:
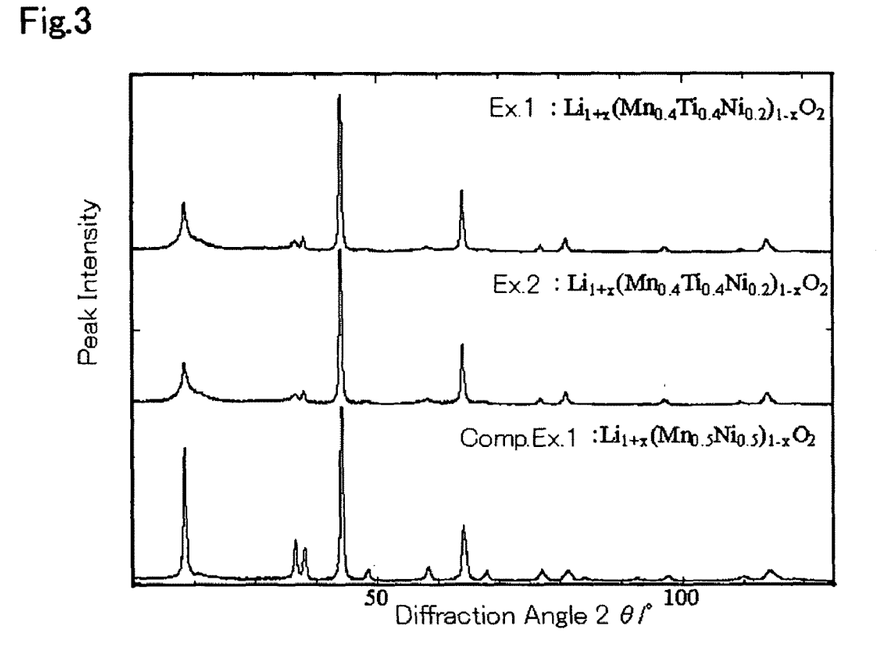
FIG. 3 is a graph showing the X-ray diffraction patterns of samples according to Examples 1 and 2, as well as Comparative Example 1.

The X-ray diffraction pattern of this product is shown in FIG. 3. According to a Rietveld analysis (using a program named "RIETAN-2000"), all of the peaks were indexed by a crystal phase with a unit cell (R $\bar{3}$m) of layered rock-salt type lithium-nickel-manganese-based composite oxide ($LiMn_{0.5}Ni_{0.5}O_2$) (first phase: a=2.886(2)Å, c=14.265(7)Å) and a crystal phase with a unit cell (Fm$\bar{3}$m) of cubic rock-salt type α-$LiFeO_2$ (second phase: a=4.1077(3)Å, the weight ratio of the first and second phases=28:72).

Chemical analysis (Table 1 below) shows that the Ni and Ti contents are 20 mol % (value m) and 39 mol % (value n), respectively, which are close to the amounts supplied, and that the value x calculated from Li/(Ni+Mn+Ti) is 0.19. The formation of a lithium-manganese-based composite oxide containing Ti and Ni ($Li_{1.19}(Mn_{0.41}Ti_{0.39}Ni_{0.20})_{0.81}O_2$) was thus confirmed in Example 1. The lithium content x of this composite oxide is clearly larger than that of the lithium-nickel-manganese-based composite oxide ($LiMn_{0.5}Ni_{0.5}O_2$) according to Comparative Example 1 described below, demonstrating that the composite oxide has a larger content of Li ions because of the presence of Ti therein.

Figure 4:
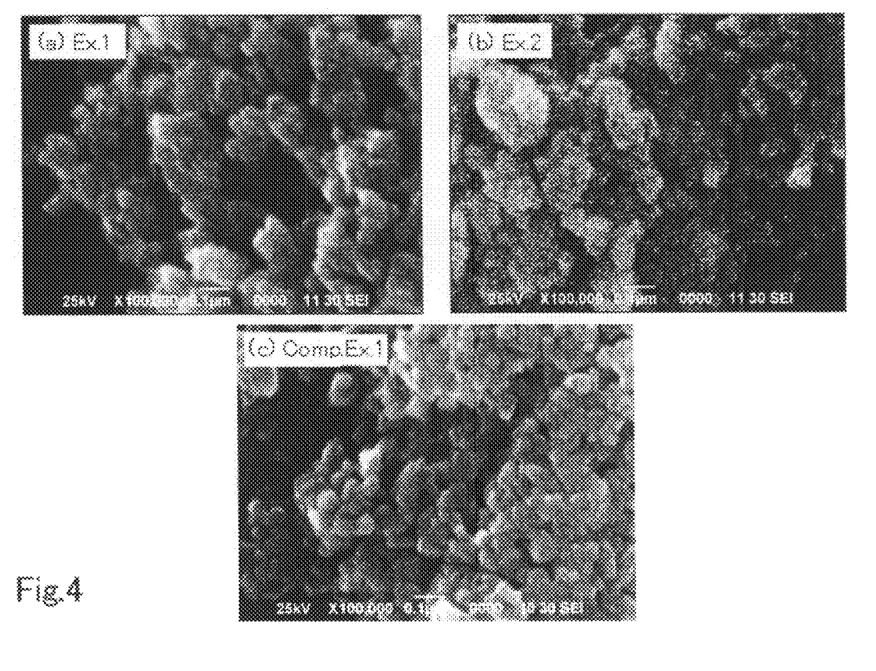

FIG. 4 (a) shows an electronic image-processed electron micrograph of the lithium-manganese-based composite oxide containing Ti and Ni obtained as the final product in Example 1. It is clear from FIG. 4 (a) that a lithium-manganese-based composite oxide containing Ti and Ni with a particle size of 100 nm or less was formed in Example 1.

Table 1 below shows the specific surface area and the chemical analysis values of each of the lithium-manganese-based composite oxide containing Ti and Ni according to Example 1 and the composite oxides according to Examples 2 and Comparative Example 1 described below. It is clear from Table 1 that the lithium-manganese-based composite oxide containing Ti and Ni according to Example 1 had a specific surface area greater than that of the lithium-nickel-manganese-based composite oxide ($LiMn_{0.5}Ni_{0.5}O_2$) according to Comparative Example 1.

TABLE 1

| | Specific surface area/ ($m^2/g$) | Li/ wt % | Ni/ wt % | Mn/ wt % | Ti/ wt % | Compositional formula $Li_{1+x}(Mn_{1-m-n}Ni_mTi_n)_{1-x}O_2$ | | |
|---|---|---|---|---|---|---|---|---|
| | | | | | | x | m | n |
| Ex. 1 | 41.1 | 9.68 | 11.2 | 21.1 | 17.8 | 0.19 | 0.20 | 0.39 |
| Ex. 2 | 42.3 | 9.57 | 11.3 | 21.5 | 17.9 | 0.18 | 0.20 | 0.39 |
| Comp. Ex. 1 | 32.1 | 7.17 | 30.3 | 28.4 | — | 0.00 | 0.50 | — |

Example 2

The procedures of forming a precipitate, hydrothermal treatment and filtering were performed in the same manner as in Example 1 to obtain a powdery product.

As in Example 1, the filtered powder was then mixed with an aqueous solution containing 5.25 g of a lithium hydroxide monohydrate dissolved in 100 mL of distilled water and stirred. The mixture was then dried at 100° C. overnight and pulverized to form a powder.

The powder was then heated in air to 600° C. over 1 hour. After firing at that temperature for 1 minute, the powder was cooled to about room temperature in a furnace, and the fired product was washed with distilled water to remove excess lithium salts. The resultant product was filtered and dried to obtain a target lithium-manganese-based composite oxide containing Ti and Ni as a powdery product.

The X-ray diffraction pattern of this product is shown in FIG. 3. According to a Rietveld analysis (using a program named "RIETAN-2000"), all of the peaks were indexed by a crystal phase with a unit cell (R $\bar{3}$m) of layered rock-salt type lithium-nickel-manganese-based composite oxide (LiMn$_{0.5}$Ni$_{0.5}$O$_2$) (first phase: a=2.889(2)Å, c=14.283(7)Å) and a crystal phase with a unit cell (Fm$\overline{3}$m) of cubic rock-salt type α-LiFeO$_2$ (second phase: a=4.1099(3)Å, the weight ratio of the first and second phases=34:66).

Chemical analysis (Table 1 above) shows that the Ni and Ti contents are 20 mol % (value m) and 39 mol % (value n), respectively, which are close to the amounts supplied, and that the value x calculated from Li/(Mi+Mn+Ti) is 0.18. The formation of a lithium-manganese-based composite oxide containing Ti and Ni (Li$_{1.18}$(Mn$_{0.41}$Ti$_{0.39}$Ni$_{0.20}$)$_{0.82}$O$_2$) was thus confirmed in Example 2. The lithium content x of this composite oxide is clearly larger than that of the lithium-nickel-manganese-based composite oxide (LiMn$_{0.5}$Ni$_{0.5}$O$_2$) according to Comparative Example 1 described below, demonstrating that the composite oxide contains a larger proportion of Li ions because of the presence of Ti therein.

FIG. 4 (b) shows an electronic image-processed electron micrograph of the lithium-manganese-based composite oxide containing Ti and Ni obtained as the final product in Example 2. It is clear from FIG. 4 (b) that a lithium-manganese-based composite oxide containing Ti and Ni with a particle size of 100 nm or less was formed in Example 2. It is also clear from Table 1 above that the lithium-manganese-based composite oxide containing Ti and Ni according to Example 2 had a specific surface area greater than that of the lithium-nickel-manganese-based composite oxide (LiMn$_{0.5}$Ni$_{0.5}$O$_2$) according to Comparative Example 1.

Comparative Example 1

A precipitate was formed from an aqueous Fe—Mn solution prepared by adding 29.72 g of a nickel chloride (II) hexahydrate and 24.74 g of a manganese (II) chloride tetrahydrate (total amount: 0.25 mol, Ni:Mn molar ratio=1:1) to 500 mL of distilled water. The precipitate was then aged, hydrothermally treated, washed with water and filtered to obtain a lithium-nickel-manganese-based composite oxide (LiMn$_{0.5}$Ni$_{0.5}$O$_2$). The above procedure was performed under the same conditions as in Example 1.

The powder thus obtained was then mixed with an aqueous solution containing 5.25 g of a lithium hydroxide monohydrate dissolved in 100 mL of distilled water, dried at 100° C. and pulverized to form a powdery product. The powder was then heated in air to 750° C. over 1 hour. After firing at that temperature for 1 minute, the powder was cooled to about room temperature in a furnace, and the fired product was washed with distilled water to remove excess lithium salts. The resultant product was filtered and dried to obtain a nickel-containing Li$_2$MnO$_3$ as a powdery product.

The X-ray diffraction pattern of this product is shown in FIG. 3. All of the peaks were indexed by a crystal phase with a unit cell (R$\overline{3}$m) of layered rock-salt type lithium-nickel manganese-based composite oxide (LiMn$_{0.5}$Ni$_{0.5}$O$_2$) (first phase: a=2.8795(5)Å, c=14.2779(19)Å) and a crystal phase with a unit cell (Fm$\overline{3}$m) of cubic rock-salt type α-LiFeO$_2$ (second phase: a=4.0966(4)Å, the weight ratio of the first and second phases=59:41). The results confirmed the formation of a lithium-nickel-manganese-based composite oxide comprising a layered rock-salt type crystal phase. The lattice parameters of the layered rock-salt type crystal phase obtained were close to the values reported for a known lithium-nickel-manganese composite oxide (LiMn$_{0.5}$Ni$_{0.5}$O$_2$) (lattice parameters: a=2.883 Å, c=14.273 Å) (J. S. Kim et al., *Electrochemistry Communications* 4, 205-209. (2002)).

Chemical analysis (Table 1 above) shows that the Ni content (value m) is 50 mol % as supplied, and the value x calculated from Li/(Mn+Ni) is 0.00. Hence, the sample obtained in Comparative Example 1 has an average composition of (Li$_{1.00}$(Ni$_{0.50}$Mn$_{0.50}$)$_{1.00}$O$_2$).

The results of chemical analysis confirmed that the sample according to Comparative Example 1 had a Li content lower than that of the sample according to Example 1, and showed a lack of Li due to the absence of Ti, even though the firing conditions were the same as in Example 1.

FIG. 4 (c) shows an electronic image-processed electron micrograph of the lithium-nickel-manganese-based composite oxide obtained as the final product in Comparative Example 1. FIG. 4 (c) confirms that as in Example 1, a lithium-nickel-manganese-based composite oxide with a particle size of 100 nm or less was formed in Comparative Example 1. As shown in Table 1, however, the specific surface area of this sample was smaller than that of the sample according to Example 1, showing that particle growth occurred.

The results clarified that the sample according to Comparative Example 1 showed a lack of Li, even though the preparation conditions were the same as in Examples 1 and 2 except that titanium sulfate was not added. This confirms that a lack of Li can be prevented by the presence of titanium ions, as described in Examples 1 and 2.

Charge/Discharge Tests

Coin-type lithium cells were prepared, each using a positive electrode material obtained by dry-blending 20 mg of a composite oxide according to Example 1 or composite oxide according to Comparative Example 1 with 5 mg of acetylene black and 0.5 mg of PTFE powder; Li metal as a negative electrode material; and a 1 M solution containing LiPF$_6$ dissolved in a solvent mixture of ethylene carbonate and diethyl carbonate as an electrolyte. The charge/discharge characteristics of each lithium cell were studied at 60° C. (voltage range: 2.5-4.5 V, current density: 42.5 mA/g). Each measurement was started from the beginning of charging the cell.

Figure 5:
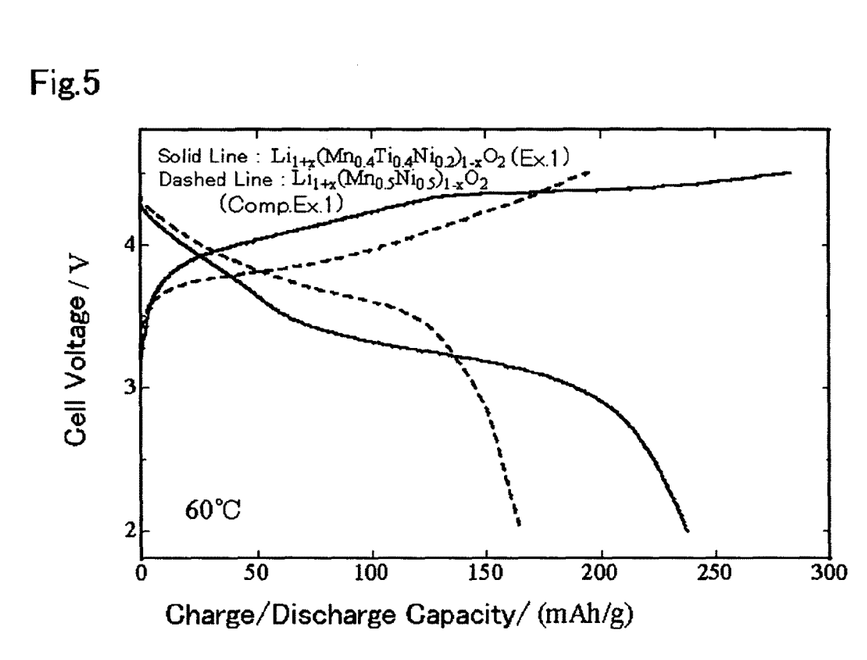
FIG. 5 is a graph illustrating the initial charge/discharge characteristics at 60° C. of coin-type lithium cells each using a sample according to Example 1 or Comparative Example 1 as positive electrode materials.

FIG. 5 is a graph illustrating the initial charge/discharge characteristics of each lithium cell using the positive electrode material according to Example 1 or Comparative Example 1. In FIG. 5, the upward curves correspond to the charge curves, and the downward curves correspond to the discharge curves. Table 2 shows the initial charge/discharge capacity, energy density, and charge/discharge efficiency of each cell.

TABLE 2

| | Initial charge capacity/ (mAh/g) | Initial discharge capacity/ (mAh/g) | Initial charge/ discharge efficiency/% | Average initial discharge voltage/V | Energy density during initial discharge/ (mWh/g) |
|---|---|---|---|---|---|
| Ex. 1 | 283 | 237 | 84 | 3.29 | 780 |
| Comp. Ex. 1 | 195 | 165 | 85 | 3.58 | 591 |

It is clear from FIG. 5 and Table 2 that the cell using the positive electrode material according to Example 1 comprising a lithium-manganese-based composite oxide containing Ti and Ni exhibits an initial charge/discharge capacity and an energy density higher than those of the cell using the positive electrode material according to Comparative Example 1 comprising a lithium-nickel-manganese-based composite oxide, although it has a substantially equal charge/discharge efficiency and a lower average voltage.

Figure 6:
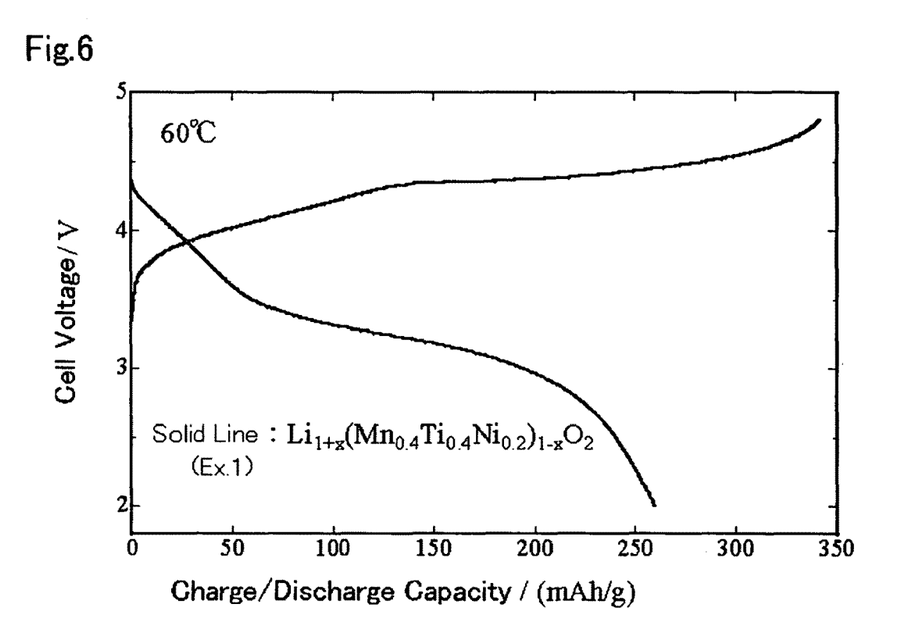
FIG. 6 is a graph illustrating the initial charge/discharge characteristics of a coin-type lithium cell using a sample according to Example 1 as a positive electrode material measured at 60° C. and an upper-limit voltage of 4.8 V.

FIG. 6 and Table 3 show the initial charge/discharge data obtained when the upper-limit voltage was increased from 4.5 V to 4.8 V under the same charge/discharge test conditions as described above. These results show that increasing the upper-limit voltage by 0.3 V can further increase the initial charge/discharge capacity and energy density.

TABLE 3

| | Initial charge capacity/ (mAh/g) | Initial discharge capacity/ (mAh/g) | Initial charge/discharge efficiency/% | Average initial discharge voltage/V | Energy density during initial discharge/ (mWh/g) |
|---|---|---|---|---|---|
| Ex. 1 | 342 | 260 | 76 | 3.24 | 840 |

The aforementioned results confirmed that the lithium-manganese-based composite oxide containing Ti and Ni according to the invention exhibits excellent charge/discharge characteristics in the charge/discharge test at a temperature as high as 60° C., and exhibits excellent performance as a lithium-manganese-based positive electrode material for use in lithium-ion batteries.

For the evaluation of charge/discharge characteristics at a lower temperature, coin-type lithium cells were prepared, each using a positive electrode material obtained by dry-blending 20 mg of a composite oxide prepared according to Example 2 or a composite oxide prepared according to Comparative Example 1 with 5 mg of acetylene black and 0.5 mg of PTFE powder; Li metal as a negative electrode material; and a 1 M solution containing $LiPF_6$ dissolved in a solvent mixture of ethylene carbonate and dimethyl carbonate as an electrolyte. The charge/discharge characteristics of each lithium cell were studied at 30° C. (voltage range: 2.5-4.8 V, current density: 42.5 mA/g). Each measurement was started from the beginning of charging the cell.

Figure 7:
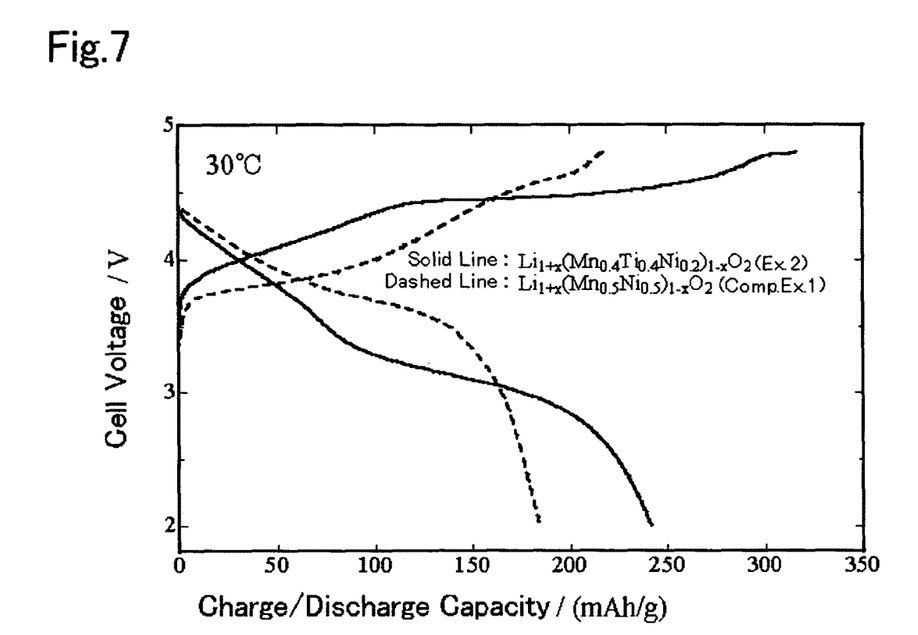
FIG. 7 is a graph illustrating the initial charge/discharge characteristics of coin-type lithium cells each using a sample according to Example 2 or Comparative Example 1 as positive electrode materials measured at 30° C.

FIG. 7 is a graph illustrating the initial charge/discharge characteristics of each lithium cell using the positive electrode material according to Example 2 or Comparative Example 1. In FIG. 7, the upward curves correspond to the charge curves, and the downward curves correspond to the discharge curves. Table 4 shows the initial charge/discharge capacity, energy density, and charge/discharge efficiency of each cell.

TABLE 4

| | Initial charge capacity/ (mAh/g) | Initial discharge capacity/ (mAh/g) | Initial charge/ discharge efficiency/% | Average initial discharge voltage/V | Energy density during initial discharge/ (mWh/g) |
|---|---|---|---|---|---|
| Ex. 2 | 317 | 242 | 76 | 3.28 | 793 |
| Comp. Ex. 1 | 217 | 184 | 85 | 3.65 | 672 |

It is clear from FIG. 7 and Table 4 that the cell using the positive electrode material according to Example 2 comprising a lithium-manganese-based composite oxide containing Ti and Ni exhibits an initial charge/discharge capacity and an energy density higher than those of the cell using the positive electrode material according to Comparative Example 1 comprising a lithium-nickel-manganese-based composite oxide, although it has a substantially equal charge/discharge efficiency and a lower average voltage.

The aforementioned results confirmed that the lithium-manganese-based composite oxide containing Ti and Ni according to the invention exhibits excellent charge/discharge characteristics also in the charge/discharge test at a room temperature of 30° C., and exhibits excellent performance as a lithium-manganese-based positive electrode material for use in lithium-ion batteries.

For the evaluation of charge/discharge characteristics at a lower temperature, coin-type lithium cells were prepared, each using a positive electrode material obtained by dry-blending 20 mg of a composite oxide prepared according to Example 2 or a composite oxide prepared according to Comparative Example 1 with 5 mg of acetylene black and 0.5 mg of PTFE powder; Li metal as a negative electrode material; and a 1 M solution containing $LiPF_6$ dissolved in a solvent mixture of ethylene carbonate and dimethyl carbonate as an electrolyte. The charge/discharge characteristics of each lithium cell were studied at 30° C. (voltage range: 2.0-4.8 V, current density: 42.5 mA/g). Each measurement was started from the beginning of charging the cell. The temperature during discharging was also varied to 0 and −20° C., in addition to 30° C. As to the discharge test at −20° C., evaluation was also performed at a reduced current density of 8.5 mA/g. Prior to the discharge test at each temperature, the lithium cells were charged, discharged and then charged at 30° C. and the same current density as in the test.

Figure 8:
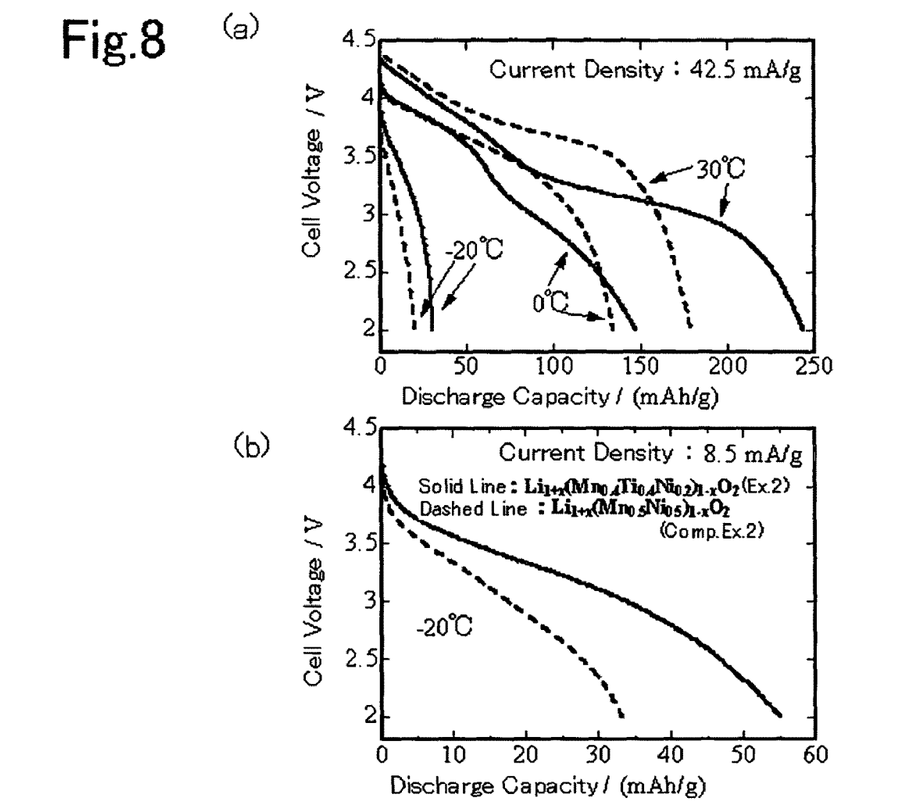

FIGS. 8 (a) and (b) are graphs illustrating the discharge characteristics of each lithium cell using the positive electrode material according to Example 2 (solid line) or Comparative Example 1 (dashed line) at the three different temperatures (30, 0 and −20° C.) after being charged to 4.8 V at 30° C. Table 5 below shows the charge/discharge data obtained in this test.

TABLE 5

| | Discharge capacity/ (mAh/g) at 30° C. and a current density of 42.5 mA/g | Discharge capacity/(mAh/g) at 0° C. and a current density of 42.5 mA/g | Discharge capacity/(mAh/g) at −20° C. and a current density of 42.5 mA/g | Discharge capacity/(mAh/g) at −20° C. and a current density of 8.5 mA/g |
|---|---|---|---|---|
| Ex. 2 | 243 | 149 | 31 | 55 |
| Comp. Ex. 1 | 179 | 134 | 20 | 33 |

It is clear from FIG. 8 and Table 5 that the cell using the positive electrode material according to Example 2 comprising a lithium-manganese-based composite oxide containing Ti and Ni exhibits, at every temperature, a discharge capacity higher than that of the cell using the positive electrode material according to Comparative Example 1 comprising a lithium-nickel-manganese-based composite oxide.

The aforementioned results established that the lithium-manganese-based composite oxide containing Ti and Ni according to the invention exhibits excellent discharge characteristics, not only at a temperature as high as 60° C., but also at an increased current density at 30° C. or at a temperature as low as −20° C. The lithium-manganese-based composite oxide containing Ti and Ni according to the invention was hence confirmed to have excellent performance as a positive electrode material for lithium-ion batteries.

The invention claimed is:

1. A lithium-manganese-based composite oxide having a crystal phase of layered rock-salt structure and a crystal phase of cubic rock-salt structure, containing Ti and Ni, and represented by the compositional formula: $Li_{1+x}(Mn_{1-n-m}Ni_m Ti_n)_{1-x}O_2$, wherein $0 < x \leq 0.33$, $0.05 < m < 0.3$, and $0.3 < n < 0.5$.

2. The lithium-manganese-based composite oxide containing Ti and Ni according to claim 1, wherein the molar ratio of Ni to Mn is from 0.2 to 0.7.

3. A method for preparing a lithium-manganese-based composite oxide containing Ti and Ni as defined in claim 1, comprising forming a precipitate by alkalizing an aqueous solution containing a manganese compound, a titanium compound, and a nickel compound;

hydrothermally treating the precipitate along with an oxidizing agent and a water-soluble lithium compound under alkaline conditions; and firing the hydrothermally treated product in the presence of a lithium compound.

4. A positive electrode material for lithium-ion batteries, comprising a lithium-manganese-based composite oxide containing Ti and Ni as defined in claim 1.

5. A lithium-ion battery comprising a positive electrode material as defined in claim 4.

* * * * *